Figure 1:
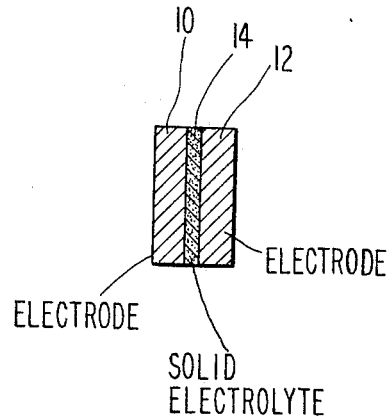

United States Patent [19]

Labes et al.

[11] 4,241,149

[45] Dec. 23, 1980

[54] CANAL CLATHRATE COMPLEX SOLID ELECTROLYTE CELL

[75] Inventors: Mortimer M. Labes, Philadelphia, Pa.; Marvin E. Jones, Roseville, Minn.; Huey-Chuen I. Kao, Philadelphia, Pa.

[73] Assignee: Temple University, Philadelphia, Pa.

[21] Appl. No.: 59,283

[22] Filed: Jul. 20, 1979

[51] Int. Cl.³ .......................... H01M 6/18; H01M 4/60
[52] U.S. Cl. ..................................... 429/50; 429/192; 429/213; 29/623.1
[58] Field of Search .................. 429/101, 192, 213, 50; 29/623.1

[56] References Cited

U.S. PATENT DOCUMENTS

| | | | |
|---|---|---|---|
| 3,773,557 | 11/1973 | Mead | 429/192 |
| 4,148,975 | 4/1979 | Schneider et al. | 429/213 |

Primary Examiner—Donald L. Walton
Attorney, Agent, or Firm—Miller and Prestia

[57] ABSTRACT

An electrolytic cell wherein one of the elements is comprised of a canal clathrate complex of benzophenone and a polyiodide salt of a cation from a group consisting of potassium ($K^+$), sodium ($Na^+$), cesium ($Cs^+$), lithium ($Li^+$), ammonium ($NH_4^+$), rubidium ($Rb^+$) and tetraalkylammonium ($R_4N^+$ where R is an alkyl group of less than five carbons). This complex functions through its tunnel-like dispositions of the cations, having certain unfilled sites and certain other sites occupied by the $CHCl_3$ molecule, as a solid fast ion conductor. The same composition, again apparently because of the canal clathrate complex crystal structure, is adapted, by virtue of its electronic conductivity to function as an electrode in an electrolytic cell.

11 Claims, 2 Drawing Figures

U.S. Patent     Dec. 23, 1980     4,241,149

CANAL CLATHRATE COMPLEX SOLID ELECTROLYTE CELL

The government has rights in this invention pursuant to Grant No. DMR 77-01055 awarded by the National Science Foundation.

This invention pertains to improved solid electrolytic cells and elements thereof based upon a solid canal clathrate complex adapted by virtue of its ionic and electronic conductivity to function either as an electrolytic cell electrolyte or electrode.

Various compositions and materials have been developed for specific characteristics in solid electrolytic cells. For example, solid fast ion conductors have been extensively studied for use as electrolytes in specific applications. In one such application, lithium iodide is the solid ion conductor electrolyte used in a primary battery in a human pacemaker.

A variety of other inorganic compounds and salts have been used both as electrolytes and electrodes in electrolytic cells. Some organic compounds have been used as iodine containing electrodes.

In heretofore unrelated technology, A.M. Clover reported in the *American Chemical Journal*, Vol. 31 Page 256 (1904) a synthesis and study of a benzophenone—potassium iodide-iodine composition having the formula $(benzophenone)_9 (KI)_2 (I)_7 CHCl_3$.

Clover reported that this compound was comprised of hexagonal prism crystals with dark blue bases and golden luster sides.

The general objective of the present invention is to provide novel solid electrolytic cell elements, based upon the unique crystal structure of benzophenone polyiodide clathrate complexes which provide both some electronic conductivity and some ionic conductivity.

A more specific object of the present invention is to provide a novel fast ion solid conductor having a unique crystal structure adapted to transport ions.

Still another object of this invention is to provide an improved electrolytic cell based upon an electrode of a canal clathrate complex.

These objects, and others which will be apparent in the course of the subsequent discussion, are met by the present invention which comprises, in brief, an electrolytic cell wherein one of the elements is comprised of a canal clathrate complex of benzophenone and a polyiodide salt of an ion from the group consisting of potassium ($K^+$), sodium ($Na^+$), cesium ($Cs^+$), lithium ($Li^+$), ammonium ($NH_4^+$), rubidium ($Rb^+$) and tetraalkylammonium ($R_4N^+$ where R is an alkyl group of less than five carbons). This complex functions through its tunnel-like disposition of the cations, having certain unfilled sites and certain other sites occupied by the $CHCl_3$ molecule, as a solid fast ion conductor. The same composition, again apparently because of the canal clathrate complex crystal structure, is adapted, by virtue of this electronic conductivity to function as an electrode in an electrolytic cell. Still further, because the benzophenone polyiodide complex is a relatively good source of free iodine with relatively low iodine vapor pressure, this composition is also adapted to function as the cathode in a primary battery wherein a metal, such as silver or lithium, functions as the counter electrode and the electrolyte is a metal salt, such as silver or lithium iodide, formed by contact of the metal electrode surface with the surface of the benzophenone polyiodide counter electrode.

For a better understanding of the present invention, reference may be made to the following detailed description thereof, taken in conjunction with the subjoined claims and the figures in which:

FIG. 1 is a diagrammatic illustration of a simple electrolytic cell comprised of an electrode 10, a counter-electrode 12, both adapted to be connected to an external conductor, and an electrolyte 14, disposed therebetween, the electrolyte in this case being a solid material from that class of materials known as solid fast ion conductors.

Figure 2:
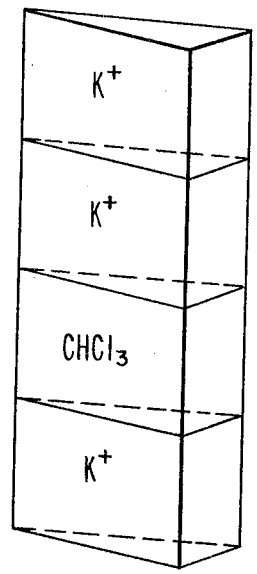

FIG. 2 is a schematic diagram of the crystal structure of the "B" lattice of the canal clathrate complex. The crystal structure consists of two interpenetrating lattices - the "B" lattice and the "I" lattice. The "B" lattice has columns consisting of successive layers of three benzophenone molecules arranged in groups with their oxygen atoms pointing to the center of a canal which contains the cation (in FIG. 2 the $K^+$ ion) and some solvent molecules (in FIG. 2, $CHCl_3$). The "I" lattice has columns of $I_x{}^{-y}$ running parallel to the columnar arrays pictured in FIG. 2.

The present invention is based upon the unique ion conductivity, together with notable electronic conductivity, of certain clathrate complexes having a tunnel-like disposition of the cation and a columnar polyiodide anion. The only such clathrates now known to have these characteristics are based on benzophenone, although other organic molecules of similar structure are believed to be likely to be adapted to form similar tunnel complex clathrates.

The unique ion conductivity is believed attributable to the cations disposed in the linearly enclosed space of the benzophenone clathrate. This structure is completed by the anion disposed along the outer surface of the tunnel-like formation of the clathrate molecular structure. Residue solvent molecule ($CHCl_3$) may also play some part in this conductivity, along with the apparently random, unoccupied sites along the cation chain. The electronic conductivity is believed largely attributable to the polyiodide chain.

In one study of the ionic conductivity of these compositions, laboratory electrolytic cells were formed with the benzophenone polyiodide clathrate complex as electrolyte between metal and aquadag electrodes and the electrolyte sectioned at successive intervals at the passage of current. In a succession of tests of this kind, it was found that the unoccupied cation sites do not remain constant but rather appear to move through the material, suggesting that ionic conductivity occurs by virtue of movement of ions along the length of the tunnel complex probably utilizing the unoccupied sites.

Generally speaking, the ion, which the composition of benzophenone polyiodide tunnel clathrate complexes are adapted to transport, are small metal cations. To complete an electrolytic cell, the benzophenone polyiodide electrolyte would be associated in an ion-receiving relationship with suitable electrodes.

In still another embodiment of the present invention, the electronic conductivity of the benzophenone polyiodide tunnel clathrate complex is utilized in an electrode of this composition counterposed with a metal electrode, such as silver or lithium which are typically used in silver or lithium halide primary batteries, of the type used in pacemakers. Such batteries are essentially electrolytic cells utilizing solid fast ion conductors, namely the metal-iodine interface between the lithium or silver and the iodine-supplying counter-electrode.

In accordance with the present invention, this iodine-supplying counter-electrode may be the benzophenone polyiodide clathrate and the cell is formed by placing the metal, such as silver or lithium, electrode surface in contact with the benzophenone polyiodide counter-electrode and permitting the electrodes to react at their interface to form the metal iodide electrolyte.

While this invention has been described with reference to specific embodiments thereof, and particularly to specific compositions of tunnel clathrate complexes, it should be understood that it is not limited thereto. Numerous other tunnel clathrate complexes of crystal structure similar to that described above are likely to be available from the general class of organic molecules similar to benzophenone. Such possible alternatives includes the other carbon compounds reported in the 1904 Clover article and substituted benzophenones, such as 4-methoxybenzophenone, 4-bromobenzophenone, 4-dimethylaminobenzophenone and bis-4-dimethylaminobenzophenone. Such compounds may also form tunnel clathrate complexes suitable for incorporation in the present invention.

Having described our invention, we claim:

1. In an electrolytic cell having three elements, namely two electrodes and an electrolyte therebetween, the improvment wherein one of said elements is comprised of a canal clathrate complex of benzophenone or substituted benzophenone and a polyhalide salt of a cation from the group consisting of $K^+$, $Na^+$, $Cs^+$, $Li^+$, $NH_4^+$, $Rb^+$, and $R_4N^+$, where R is an alkyl group of less than five carbons.

2. An improved electrolytic cell as recited in claim 1, wherein said canal clathrate complex has the formula (Benzophenone)$_9$ (MI)$_2$I$_7$CHCl$_3$, wherein M represents said cation.

3. Method for transporting cations comprising passing said cations through a canal clathrate complex of benzophenone and a polyhalide salt of a cation from the group consisting of $Li^+$, $K^+$, $Na^+$, $Cs^+$, $NH_4^+$, $Rb^+$, and $R_4N^+$, where R is an alkyl group of less than five carbons.

4. Electrolytic cell comprising a cation source and a cation receiver and, disposed therebetween, a solid electrolyte comprising a canal clathrate complex of benzophenone and a polyiodide salt of a cation from the group consisting of $Li^+$, $K^+$, $Na^+$, $Cs^+$, $NH_4^+$, $Rb^+$, and $R_4N^+$, where R is an alkyl group of less than five carbons.

5. Electrolytic cell comprising a solid state cation conductor comprising a canal clathrate complex of benzophenone and a polyiodide salt of a cation from the group consisting of $Li^+$, $K^+$, $Na^+$, $Cs^+$, $NH_4^+$, $Rb^+$, and $R_4N^+$, where R is an alkyl group of less than five carbons, in cation conductive association on one side thereof with a source of cations which said cation conductor is adapted to transport and on the other side thereof with a receiver for said cations.

6. Electrolytic cell having an electrolyte and two electrodes disposed on opposed sides thereof, one of said electrodes comprising a metal and the second of said electrodes comprising a canal clathrate complex of benzophenone and a polyiodide salt of a cation from the group consisting of $Li^+$, $K^+$, $Na^+$, $Cs^+$, $NH_4^+$, $Rb^+$, and $R_4N^+$, where R is an alkyl group of less than five carbons.

7. Electrolytic cell, as recited in claim 6, wherein said cell is a primary battery 8. Electrolytic cell, as recited in claim 7, wherein said first electrode is silver or lithium.

9. Electrolytic cell, as recited in claim 8, wherein second electrode is a composition having the formula (Benzophenone)$_9$ (MI)$_2$I$_7$CHCl$_3$, wherein M represents said cation.

10. Method of making an electrolytic cell comprising placing a metal first electrode surface in contact with a second electrode surface, said second electrode consisting of a canal clathrate complex of benzophenone and a polyiodide salt of a cation from the group consisting of $Li^+$, $K^+$, $Na^+$, $Cs^+$, $NH_4^+$, $Rb^+$, and $R_4N^+$, where R is an alkyl group of less than five carbons.

11. Method as recited in claim 10 wherein said metal is silver or lithium and said salt is silver or lithium iodide.

* * * * *